May 14, 1968     Q. L. HAMPTON     3,382,981
SEWAGE TREATMENT PLANT
Filed Aug. 5, 1966     3 Sheets-Sheet 2
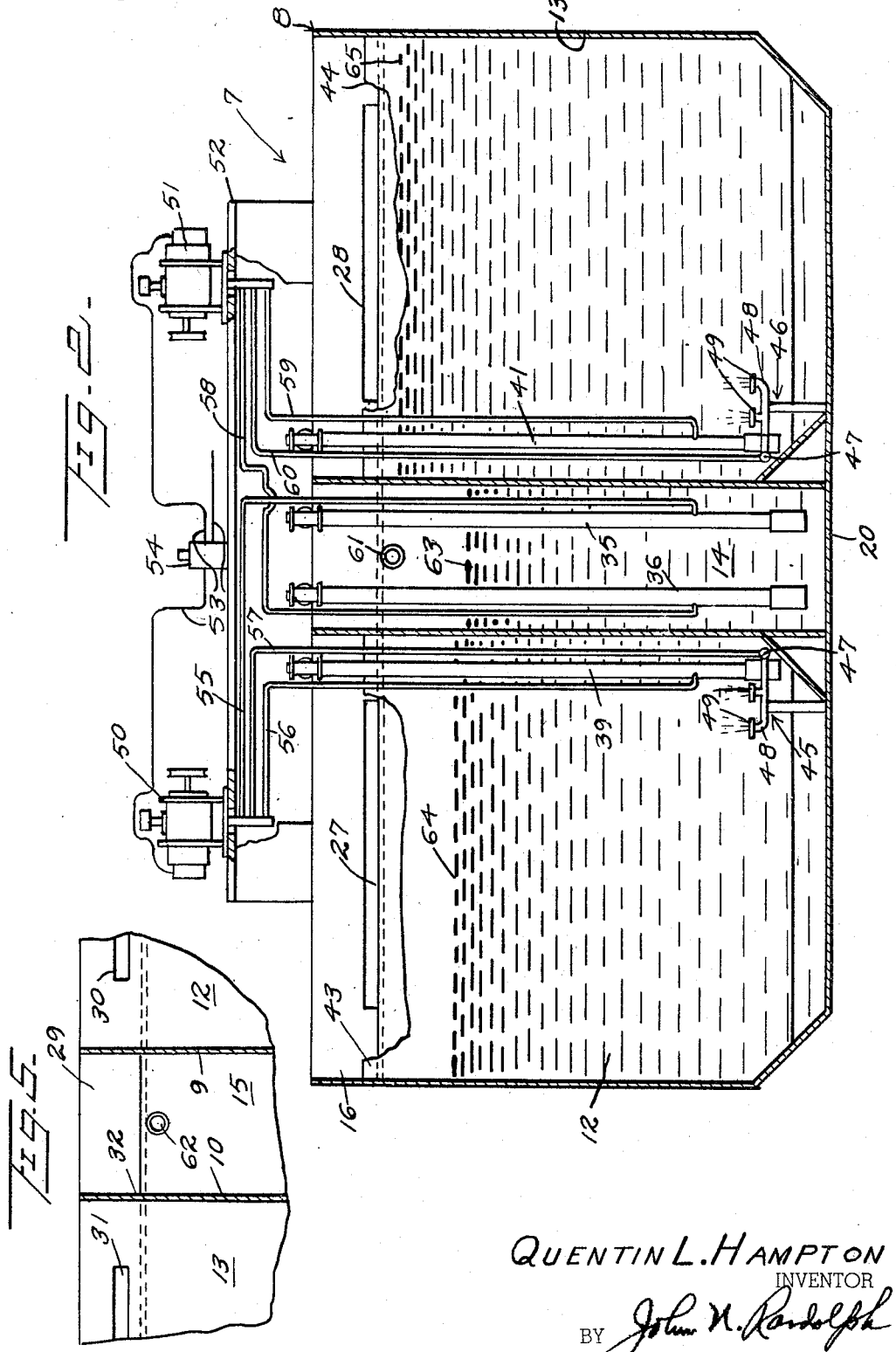
QUENTIN L. HAMPTON
INVENTOR
BY John N. Randolph
ATTORNEY

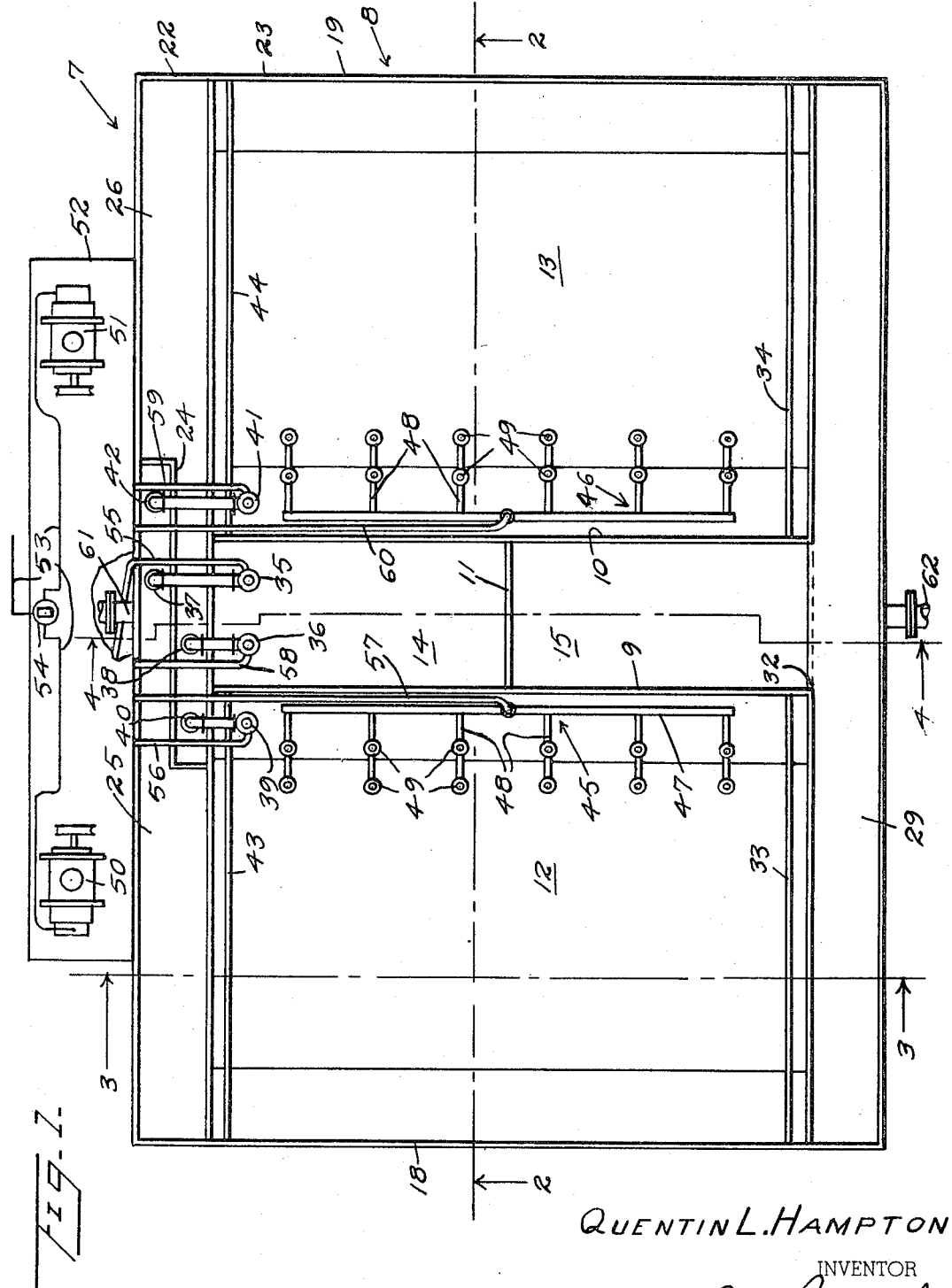

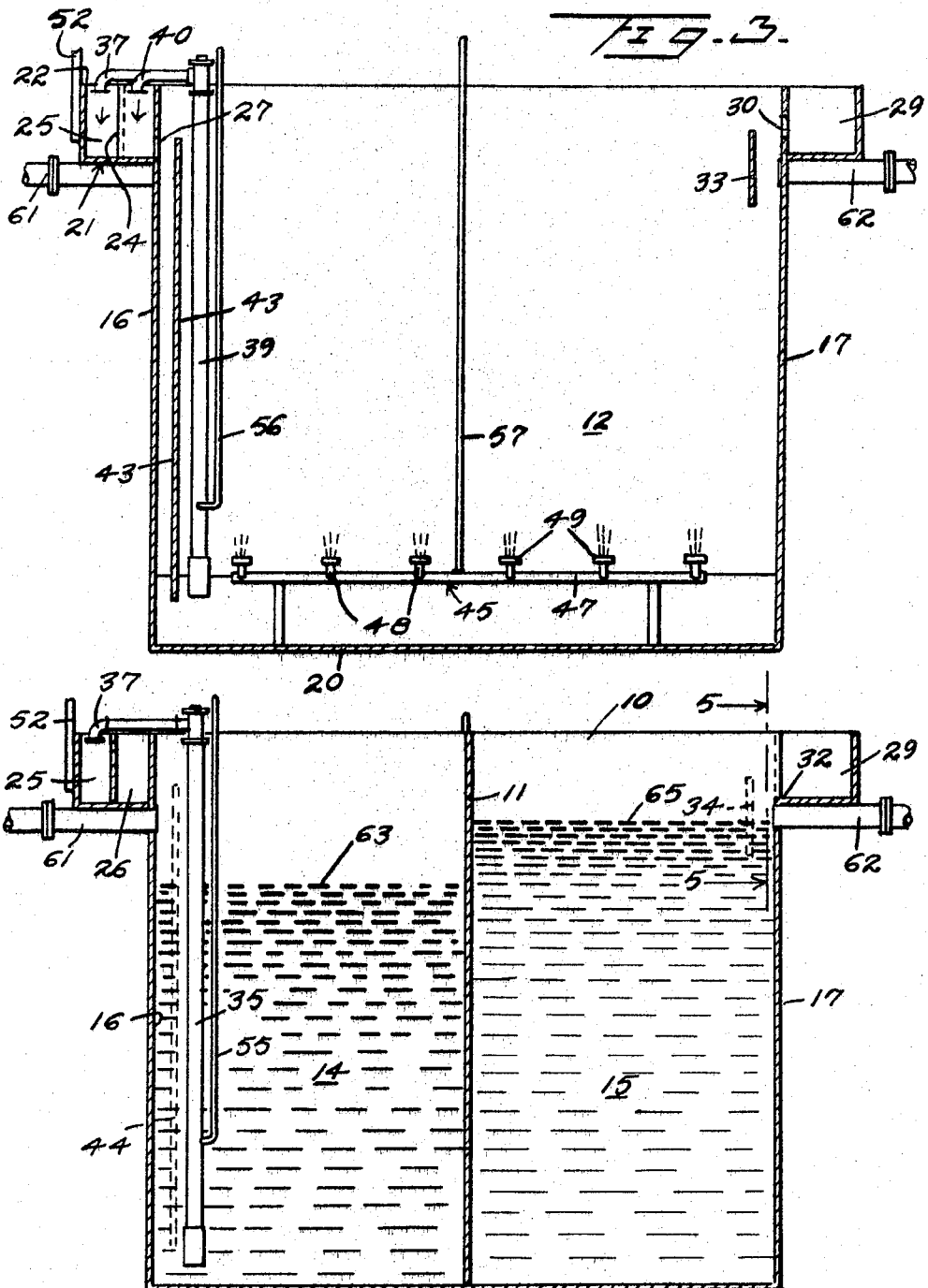

United States Patent Office 3,382,981
Patented May 14, 1968

3,382,981
SEWAGE TREATMENT PLANT
Quentin L. Hampton, 64 Kent Drive,
Ormond Beach, Fla. 32020
Filed Aug. 5, 1966, Ser. No. 570,619
1 Claim. (Cl. 210—142)

ABSTRACT OF THE DISCLOSURE

A sewage treatment plant for the treatment of sewage by the activated sludge process of sewage purification and which utilizes two tanks or basins with either functioning as an aeration tank and while the other functions as a separation tank. The purified liquid is separated from the sludge mixture and drawn off from the separating tank. The remaining sludge mixture is utilized in the treatment process when said separation tank is thereafter employed as the aeration tank.

This invention relates to a novel plant of extremely simple construction for effecting the treatment of sewage by the activated sludge process of sewage purification, and has for its primary object to provide a plant including two tanks or basins either of which may function as an aeration tank while the other is functioning as a separation tank or basin.

Another object of the invention is to provide a sewage treatment plant including reversible air supply means for reversing the flow of the raw sewage and the flow of air to an air diffuser of one or the other of the aforementioned tanks, for automatically and periodically reversing such flow to cause each of the tanks to alternately function as an aerating tank and a separating tank.

A further object of the invention is to provide a novel sewage treatment plant which eliminates the need for and the use of settling tanks, sludge collecting and removal mechanisms, process liquid valves, controls and the like.

Another object of the invention is to provide a sewage treatment plant affording complete and continuous mixing of the raw sewage being treated with active sludge culture throughout the entire time that the sewage remains in the plant.

Still a further object of the invention is to provide a sewage treatment plant including an influent chamber which functions as a system balancing means, a trash trap and a grit chamber.

Various other objects and advantages of the invention will hereinafter become more fully apparent from the following description of the drawings, illustrating a presently preferred embodiment thereof, and wherein:

FIGURE 1 is a top plan view, partly broken away, of the sewage treatment plant;

FIGURE 2 is a longitudinal sectional view thereof, partly broken away, taken substantially along a plane as indicated by the line 2—2 of FIGURE 1;

FIGURE 3 is a transverse sectional view taken substantially along a plane as indicated by the line 3—3 of FIGURE 1, and partly broken away;

FIGURE 4 is a transverse sectional view taken substantially along the line 4—4 of FIGURE 1, and partly broken away; and FIGURE 5 is a fragmentary vertical sectional view taken substantially along a plane as indicated by the line 5—5 of FIGURE 4.

Referring more specifically to the drawings, the sewage treatment plant, in its entirety, is designated generally 7 and includes an elongated open top receptacle 8 having two transverse partitions 9 and 10 which are disposed in spaced apart substantially parallel relation to one another and a partition 11 which extends between the partitions 9 and 10. The partitions 9, 10 and 11 extend from the bottom to the open top of the receptacle and divide the receptacle into two large end chambers or tanks 12 and 13 and two small chambers 14 and 15. The chambers 14 and 15 are disposed between the partitions 9 and 10 and are separated from one another by the partition 11.

The receptacle 8 includes side walls 16 and 17, end walls 18 and 19 and a bottom 20. The tank or chamber 12 is defined by portions of the side walls 16 and 17, a portion of the bottom 20, the end wall 18 and partition 9. The tank or chamber 13 is defined by other portions of the side walls 16 and 17, another portion of the bottom 20, the end wall 19 and partition 10. The chamber 14 is formed by parts of the partitions 9 and 10, a part of the bottom 20, a portion of the wall 16, and the partition 11. The chamber 15 is formed by parts of the partitions 9 and 10, a part of the bottom 20, a part of the side wall 17, and the partition 11.

A gutter member 21 is mounted on the outer side of the side wall 16 and extends from end to end thereof. The gutter member 21 has an open top 22 which is disposed flush with the open top 23 of the receptacle 8 and said gutter member has a partition 24, as best seen in FIGURE 1, dividing it into two troughs 25 and 26. As best seen in FIGURE 2, the wall 16 has two elongated slots 27 and 28. The slot 27 forms a communicating passage between the trough 25 and the tank 12 and the slot 28 forms a similar passage between the trough 26 and tank 13. The bottoms of said slots are disposed flush with the bottoms of the troughs, as seen in FIGURE 3.

A trough 29 is mounted on and extends from end to end of the outer side of the wall 17 and has its open top disposed flush with the open top 23 of the receptacle. The wall 17 has an elongated opening 30 connecting the trough 29 to the tank 12, and a similar opening 31 connects the trough 29 to the tank 13, as seen in FIGURE 5. The bottoms of the openings 30 and 31 are disposed above the level of the bottom of the trough 29. The side wall 17 is cut away between the partitions 9 and 10 down to the bottom of the trough 29 to provide an opening 32 from said trough into the chamber 15, as seen in FIGURE 4. A baffle 33 is disposed in the tank 12 and extends between and is supported by end wall 18 and partition 9. The baffle 30 is located adjacent the side wall 17, in a vertical plane, and with its upper edge above the bottom edge of the opening 30 and beneath the top edge thereof. A similar baffle 34 is disposed in the same manner in tank 13 and relative to the opening 31.

As best seen in FIGURE 2, two air lift pumps 35 and 36 are disposed in the chamber 14, adjacent the wall 16 and with their lower inlet ends located near the bottom of said chamber. As seen in FIGURE 1, the airlift pump 35 has an outlet end 37 discharging into the trough 25, and the airlift pump 36 has an outlet end 38 discharging into the trough 26. An airlift pump 39 is mounted in the tank 12 near the wall 16 with its lower inlet end disposed adjacent the bottom of said tank and with its outlet end 40 discharging into the trough 26. An airlift pump 41 is similarly disposed in the tank 13 with its outlet end 42 discharging into the trough 25.

A baffle 43 is disposed in the tank 12 and extends between and is secured to the wall 18 and parition 9. Said baffle is disposed in a vertical plane between and spaced from the wall 16 and airlift pump 39 and has its upper edge disposed at approximately the level of the upper edge of the opening 27 and its bottom edge disposed above the tank bottom but beneath the lower inlet end of the airlift pump 39. A baffle 44 is similarly disposed in the tank 13 relative to the wall 16, airlift pump 41 and the opening 28.

An air diffuser 45 is mounted in the lower part of the tank 12 and a corresponding air diffuser 46 is mounted in the lower part of the tank 13. Each air diffuser includes a manifold 47 having a plurality of laterally projecting branches 48 each of which is provided with one or more upwardly discharging nozzles 49.

Two blowers 50 and 51 are mounted on a suitable support 52 and are connected to a source of electric current by electrical wiring 53 in which is interposed a variable time switch 54. Three air conduits 55, 56 and 57 lead from the blower 50 to the airlift pump 35, the airlift pump 39 and the air diffuser 45, respectively, and three conduits 58, 59 and 60 lead from the blower 51 to the airlift pump 36, the airlift pump 41 and the diffuser 46, respectively.

The chamber 14 constitutes an influent chamber to which raw sewage 63 is supplied by gravity or pressure through a conduit 61 which discharges into the chamber 14 through the wall 16, beneath the gutter member 21. The chamber 15 constitutes an effluent chamber from which the purified liquid is carried off through a conduit 62 which connects with said chamber through the wall 17 and beneath the trough 29. Either the tank 12 or the tank 13 may function as an aeration basin with the other acting as a separation basin. Assuming that tank 12 is utilized as an aeration basin, the switch 54 is turned to close the electric circuit to the blower 50 so that said blower will operate for a predetermined time interval, usually 30 minutes to 4 hours, and while the blower 51 is deenergized. Air under pressure will be supplied through the conduits 55, 56 and 57 to the air pumps 35 and 39 and the air diffuser 45, respectively. The pump 35 will lift the raw sewage from the influent chamber 14 and will discharge it into the influent trough 25 from which it will flow by gravity through the slot 27 into the aeration tank or basin 12 and down behind the baffle 43. The sewage in the basin 12 will be aerated by the air discharging from the nozzles 49 of the diffuser 45 to produce its own activated sludge. The airlift pump 39 lifts the sewage and sludge mixture 64 from the basin 12 and discharges it into the influent trough 26 from which it flows by gravity through the opening 28 into the separation basin 13, passing downwardly to the bottom thereof between the wall 16 and baffle 44. In the basin 13 the sewage and sludge mixture is quiescent and separates since the pump 41 and air diffuser 46 are not operating. The purified liquid 65 rises in the tank 13 while the separated sludge settles to the bottom thereof. The purified liquid overflows from the separation basin 13 into the effluent trough 29 through the slot 31 and then passes by gravity from the trough 29 through the opening 32 into the effluent tank 15 from which it is carried off through the effluent pipe 62. Thus, in the operation of plant 7 the purified liquid is separated from the sludge mixture and is discharged from the plant, whereas in other systems the activated sludge is separated and removed from the purified liquid. In the operation of the sewage treatment plant 7, the sludge mixture, from which the purified liquid has been separated, remains in the separation tank.

The aerated raw sewage produces an activated sludge in connection with its treatment in the plant 7 which assimilates organic solids contained in the sewage and produces, through this assimilation, a fraction of inorganic solids, water, gases and additional living organisms. The undissolved inorganic end products of this activated sludge assume the form of ash-like particles which are very light in weight and flow out of the system with the purified liquid and may be discharged with the effluent into most receiving waters.

By reversing the switch 54, the blower 51 will be energized for a predetermined time interval while the blower 50 is deenergized and the raw sewage will then be pumped by the pump 36 into the influent trough 26 to flow into the tank 13 which then functions as a separation tank since its pump 41 and air diffuser 46 are operating. The mixture of sewage and sludge will be discharged from the tank 13 by the pump 41 into the influent trough 25 from which it will flow to the tank 12 which then functions as a separation basin and supplies the purified liquid to the effluent trough 29 through the slot 30, from which it flows to the effluent tank 15. Periodically when the activated sludge culture becomes too dense or heavy to be circulated in the tanks 12 and 13 by the diffusers 45 and 46, respectively, the sludge culture is drawn off to obtain a thinner and more easily aerated liquid.

Various modifications and changes are contemplated and may obviously be resorted to without departing from the function or scope of the invention as hereinafter defined by the appended claim.

I claim as my invention:

1. A sewage treatment plant comprising an influent chamber, a raw sewage conduit discharging into said influent chamber, a first tank and a second tank, a first trough discharging into said first tank, a second trough discharging into the second tank, a first pump in said influent chamber discharging into the first trough for supplying raw sewage from the influent chamber to the first tank, a second pump in the influent chamber discharging into the second trough for supplying raw sewage to the second tank, means in each of the tanks for aerating the raw sewage therein, means for selectively actuating said pumps and said aerating means for supplying raw sewage to either tank and for aerating the raw sewage therein to produce a sewage and sludge mixture, a third pump located in the first tank and discharging into the second trough for supplying the mixture from the first tank to the second tank, a fourth pump located in the second tank and discharging into the first trough for supplying the mixture from the second tank to the first tank, said means selectively actuating the first and second pumps selectively actuating the third pump when the first pump is actuated and selectively actuating the second pump when the fourth pump is actuated, and means for carrying off the purified liquid.

References Cited

UNITED STATES PATENTS

| | | | |
|---|---|---|---|
| 584,736 | 6/1897 | Goodhue | 210—256 X |
| 732,208 | 6/1903 | Mitchell | 210—220 X |
| 1,904,916 | 4/1933 | Coombs | 210—195 X |
| 2,342,024 | 2/1944 | Walker | 210—221 X |
| 2,394,413 | 2/1946 | Walker | 210—195 X |
| 2,430,519 | 11/1947 | Mallory | 210—256 X |
| 2,622,858 | 12/1952 | Hughes | 210—220 X |
| 3,260,368 | 7/1966 | Wagner et al. | 210—320 X |

FOREIGN PATENTS

| | | |
|---|---|---|
| 299,590 | 8/1917 | Germany. |

OTHER REFERENCES

The Currie Claraetor, The Dorr Company, Leaflet No. 6581-C, 1938.

SAMIH N. ZAHARNA, *Primary Examiner.*

REUBEN FRIEDMAN, *Examiner.*

J. DE CESARE, *Assistant Examiner.*